(12) United States Patent
Markus et al.

(10) Patent No.: US 6,490,601 B1
(45) Date of Patent: Dec. 3, 2002

(54) SERVER FOR ENABLING THE AUTOMATIC INSERTION OF DATA INTO ELECTRONIC FORMS ON A USER COMPUTER

(75) Inventors: Matthew A. Markus, San Francisco, CA (US); Erick M. Herrarte, Berkeley, CA (US)

(73) Assignee: Infospace, Inc., Bellevue, WA (US)

( * ) Notice: Subject to any disclaimer, the term of this patent is extended or adjusted under 35 U.S.C. 154(b) by 0 days.

(21) Appl. No.: 09/231,644

(22) Filed: Jan. 15, 1999

(51) Int. Cl.$^7$ .............................................. G06F 17/21
(52) U.S. Cl. ........................ 707/507; 705/80; 709/219
(58) Field of Search ................................ 707/507–508, 707/100, 505, 513; 705/35, 37, 80; 709/217–219

(56) References Cited

U.S. PATENT DOCUMENTS

| | | | | | |
|---|---|---|---|---|---|
| 5,537,586 | A | * | 7/1996 | Amram et al. ............... | 395/600 |
| 5,987,440 | A | * | 11/1999 | O'Neil et al. .................. | 705/39 |
| 6,192,380 | B1 | * | 2/2001 | Light et al. .................... | 707/10 |
| 6,199,079 | B1 | * | 6/2001 | Gupta et al. .................. | 707/507 |
| 6,327,598 | B1 | * | 12/2001 | Kelley et al. ............ | 707/501.1 |
| 6,345,278 | B1 | * | 2/2002 | Hitchcock et al. .......... | 707/100 |
| 2001/0011250 | A1 | * | 8/2001 | Paltenghe et al. ............ | 705/41 |

FOREIGN PATENT DOCUMENTS

WO    WO 98/04976    2/1998

OTHER PUBLICATIONS

US 6,047,266, 4/2000, Bartoli et al. (withdrawn)*
Lemay, Laura. Java 1.1: Interactive Course, 1997, The Waite Group.*
Lemay, Laura. Java 1.1: Interactive Course, 1997, The Waite Group, pp. 171–174.*
Cozzens, Lisa. JavaScript Tutorial, http://www.cs.brown.edu/courses/bridge/1998/res/javascript–tutorial.html, 1998.*
Printout of Website for *About eWallet*, http://www.ewallet.com, Jan. 11, 1999, 4 pages.
Printout of Website for *Transactor Networks* (*CitiWallet*), http://www.transactor.net.com, Jan. 11, 1999, 4 pages.
Bowen, Barry D., "How popular sites use cookie technology," *Netscape Enterprise Developer*, Apr. 1997.
Sirbu, Marvin , and J.D. Tygar, "NetBill: An Internet Commerce System Optimized for Network–Delivered Services," *IEEE Personal Communications*, 34–39, Aug. 1995.
Unknown: "Gator offers one–click shopping at over 5,000 e–commerce sites today," *Internet Publication*, Origin Unknown, Jun. 14, 1999.
Unknown, "E–Commerce Leaders Announce Universal Formats for Simplified Online Payments," *Internet Publication*, Origin Unknown, Jun. 14, 1999.

* cited by examiner

*Primary Examiner*—Joseph H. Feild

(57) ABSTRACT

Apparatus, methods, and computer program products are disclosed for constructing and transmitting an executable software module on a personal information server to a remote computer. The software module is constructed such that once received by a browser displaying a form, it is executed and user data is automatically inserted into an electronic form. The software module contains field names from a downloaded form and matching data items which are inserted into the form on the remote user computer. A method for constructing a shippable software module on a personal information server suitable for execution on a remote computer for inserting data strings into an electronic form is described. A form mapping containing a set of associations between fields in the electronic form ("non-standard fields") and pre-named fields ("standard fields") on the personal information server is retrieved. Each mapping is associated with a registered electronic form. A raw data file containing data strings, each data string corresponding to a pre-named field is retrieved. Each raw data file is associated with a registered user. The form mapping is utilized to attach a data string to the field in the electronic form where the pre-named field and the field in the electronic form have been previously matched or mapped.

22 Claims, 15 Drawing Sheets

| 802 | USER | CATEGORY | TYPE | SHORT DISPLAY NAME |
|---|---|---|---|---|
| 812 | HOME. | PHYSICAL CONTACT INFORMATION, ONLINE CONTACT INFORMATION, DEMOGRAPHIC DATA | INFO. | HOME |
| 814 | WORK. | PHYSICAL CONTACT INFORMATION, ONLINE CONTACT INFORMATION, DEMOGRAPHIC DATA | WORKINFO. | WORK |
| 816 | BILLING. | PHYSICAL CONTACT INFORMATION, ONLINE CONTACT INFORMATION, DEMOGRAPHIC DATA, FINANCIAL DATA | BILLINFO. | BILLING |
| 818 | SHIPPING. | PHYSICAL CONTACT INFORMATION, ONLINE CONTACT INFORMATION, DEMOGRAPHIC DATA | INFO. | SHIPPING |

*Fig.8A.*

| INFO. | CATEGORY | TYPE | SHORT DISPLAY NAME |
|---|---|---|---|
| NAME. | PHYSICAL CONTACT INFORMATION, DEMOGRAPHIC DATA | PERSONNAME. | NAME |
| ADDRESS. | PHYSICAL CONTACT INFORMATION, DEMOGRAPHIC DATA | ADDRESS. | POSTAL ADDRESS |
| PHONE. | PHYSICAL CONTACT INFORMATION | PHONENUM. | PHONE NUMBER |
| FAX. | PHYSICAL CONTACT INFORMATION | PHONENUM. | FAX NUMBER |
| INTERNET. | ONLINE CONTACT INFORMATION | INTERNET. | INTERNET |

| WORKINFO. | CATEGORY | TYPE | SHORT DISPLAY NAME |
|---|---|---|---|
| NAME. | PHYSICAL CONTACT INFORMATION, DEMOGRAPHIC DATA | PERSONNAME. | NAME |
| EMPLOYMENT. | DEMOGRAPHIC DATA | EMPLOYMENT. | EMPLOYMENT |
| ADDRESS. | PHYSICAL CONTACT INFORMATION, DEMOGRAPHIC DATA | ADDRESS. | POSTAL ADDRESS |
| PHONE. | PHYSICAL CONTACT INFORMATION | PHONENUM. | PHONE NUMBER |
| FAX. | PHYSICAL CONTACT INFORMATION | PHONENUM. | FAX ADDRESS |
| INTERNET. | ONLINE CONTACT | INTERNET. | INTERNET |

Fig. 8B.

Table 820:

| | INFORMATION | | |
|---|---|---|---|
| | CATEGORY | TYPE | SHORT DISPLAY NAME |
| BILLINFO. | | | |
| NAME. | PHYSICAL CONTACT INFORMATION, DEMOGRAPHIC DATA | PERSONNAME. | NAME |
| ADDRESS. | PHYSICAL CONTACT INFORMATION, DEMOGRAPHIC DATA | ADDRESS. | POSTAL ADDRESS |
| PHONE. | PHYSICAL CONTACT INFORMATION | PHONENUM. | PHONE NUMBER |
| FAX. | PHYSICAL CONTACT INFORMATION | PHONENUM. | FAX ADDRESS |
| INTERNET. | ONLINE CONTACT INFORMATION | INTERNET. | INTERNET |
| CREDITCARD. | FINANCIAL DATA | CREDITCARD. | FAVORITE CREDIT CARD |

Table 824:

| | CATEGORY | TYPE | SHORT DISPLAY NAME |
|---|---|---|---|
| PERSONNAME | DEMOGRAPHIC DATA | | |
| PREFIX | PHYSICAL CONTACT INFORMATION | TEXT | PREFIX |
| FIRST | PHYSICAL CONTACT INFORMATION | TEXT | FIRST NAME |
| MIDDLE | PHYSICAL CONTACT INFORMATION | TEXT | MIDDLE NAME |
| LAST | | TEXT | LAST NAME |
| SUFFIX | DEMOGRAPHIC DATA | TEXT | SUFFIX |

Fig. 8C.

| ADDRESS | CATEGORY | TYPE | SHORT DISPLAY NAME |
|---|---|---|---|
| STREET1 | PHYSICAL CONTACT INFORMATION | TEXT | STREET1 |
| STREET2 | PHYSICAL CONTACT INFORMATION | TEXT | STREET2 |
| CITY | PHYSICAL CONTACT INFORMATION | TEXT | CITY |
| STATEPROV | PHYSICAL CONTACT INFORMATION | TEXT | STATE/PROVINCE |
| POSTALCODE | DEMOGRAPHIC DATA | TEXT | POST/ZIP CODE |
| COUNTRY | DEMOGRAPHIC DATA | TEXT | COUNTRY |

| PHONENUM. | CATEGORY | TYPE | SHORT DISPLAY NAME |
|---|---|---|---|
| AREACODE | PHYSICAL CONTACT INFORMATION | TEXT | AREA CODE |
| NUMBER | PHYSICAL CONTACT INFORMATION | TEXT | NUMBER |
| EXTENSION | PHYSICAL CONTACT INFORMATION | TEXT | EXTENSION |

SERVER FOR ENABLING THE AUTOMATIC INSERTION OF DATA INTO ELECTRONIC FORMS ON A USER COMPUTER

BACKGROUND OF THE INVENTION

1. Field of the Invention

The present invention relates generally to computer software for filling out form documents over a computer network. More particularly, the present invention provides a method and system for automatically filling out fields in an electronic form document on a browser program using a remote server.

2. Discussion of Prior Art

Rapid growth and technological advances have changed the way most people currently use computers. During the early days of computers, a paradigm existed whereby there were more computer users than computers, and thus most computers had many assigned or dedicated users. As technology progressed, the personal computer ("PC") emerged, and it became commonplace for many computers to have only one user. Subsequent growth, particularly in the 1990s, has seen a culture or paradigm emerge whereby a computer user has access to more than one computer. As such, many individuals now have substantial access to multiple computers, for example at workplaces, schools, libraries, homes, and while traveling. This ratio of available computers per computer user should increase even further over time. It is therefore increasingly desirable to have computer-based programs and services that are accessible to a particular user from any computer, and not just those computers that have been programmed or adapted for that particular user.

One result of the recent explosion in computer growth is the amount of communication that now takes place between separate computers or computer systems. Many methods and systems exist for communications between computers or computer systems. This is reflected in many contexts, such as in the growth of the Internet. For purposes of the following discussion, several methods and systems will be described with reference to the Internet as a matter of convenience. It should be understood, however, that this is not intended to limit the scope of this discussion, and that many other applicable devices and protocols for computer communications exist, such as "Intranets", closed proxy networks, enterprise-wide networks, direct modem to modem connections, etc.

A browser program capable of running one or more windows may utilize a simple process for communicating information among computers over the Internet, as illustrated in FIG. 1. Typically, an independent Internet user 106, from a pool of random independent Internet users 101–106, opens a browser window 131 in an Internet browser program, depicted by arrow 161. User 106 then enters a request for an Internet Web page 144 (i.e. an HTML page) to be downloaded into browser window 131 belonging to user 106. User 106's request is processed by the browser program, and a connection, depicted by arrow 162, is made with the appropriate remote Internet resource 112, typically an Internet Web server, selected from a pool of random remote 20 Internet resources 110–112. Remote Internet resource 112 returns an HTML document 143, depicted by arrow 163. HTML document 143 contains substantially the entire content needed to display completed Web page 144. Web page 144 is then displayed back to user 106 in browser window 131, depicted by arrow 164.

A model known in the art as the "ad server" model advances this simple browser program method for communicating information over the Internet. Many Internet Web pages are composite pages, requiring information in the form of images, text, and/or code to be pulled from several different remote Internet resources. Ad servers are generally used to integrate directed electronic material, such as banner advertisements, into such composite Internet Web pages. Thus, ad servers are one example of a remote Internet resource that separately contributes material to a composite Web page. A computer network communication process utilizing an ad server is also depicted in FIG. 1.

Independent internet user 102 opens a browser window 130 in his or her Internet browser program, depicted by arrow 151. User 102 then enters a request for an Internet Web page 142 to be downloaded into browser window 130. This request is processed by the browser program, and a connection, depicted by arrow 152, is made with the appropriate remote Internet resource 110, typically an Internet Web server. Remote Internet resource 110 returns a core HTML document 140, depicted by arrow 153. Core document 140 contains some displayable content and an additional link to another image 141, in this case a banner advertisement, stored at a separate remote Internet resource 120, in this case an ad server. The browser program parses core document 140 to find and use this link to retrieve image 141. The browser program then makes a connection, depicted by arrow 154, with remote Internet resource 120 to retrieve image 141. Remote Internet resource 120 returns image 141 to the browser program, depicted by arrow 155. Image 141 is then merged with the displayable content of core document 140 to comprise completed Web page 142. Web page 142 is then displayed back to user 102 in browser window 130, depicted by arrow 156. It should be appreciated that this process may be repeated many times for many separate portions of a particular Web page. In fact, many Web pages contain links to dozens of separate remote Internet resources, requiring this process to be repeated for each separate link.

Many remote Internet resources assign a specific user identifier containing state information, referred to as a session identifier or "cookie", to each particular user whenever a user connects to the resource, for example to retrieve an Internet Web page. This cookie is deposited into the user's browser program, which is instructed to show the cookie to the resource upon subsequent visits so that the resource can identify the user. The cookie conveys to the resource who the user is and what document or component thereof that the user wants. Use of these cookies is vital when components are assembled from various remote Internet resources into one integrated Web page, as a resource for a core HTML document may require several visits or communications from a Web browser while a page is assembled. Without such cookies, use of composite Web pages would be substantially hindered. Many resources assign temporary cookies for this purpose, which expire at the end of a session or when the browser program is closed. Other cookies, however, are assigned for longer durations for identification purposes beyond one Internet session. One such purpose identifies users, through long-term or persistent cookies, to specific user history and preferences, such that information, for example content specific banner advertisements related to such user history and preferences, may be directed at identified users in the future.

Proxy systems generally group many individual computers and computer users into a single network. This network is typically served by a single proxy server, which serves as a conduit for all communications among individual network users and between any individual network user and any outside remote electronic resource or user. A proxy server may provide several useful functions, such as faster communication between network users, firewall protection for all network computers, and large and efficient storage. One example of efficient storage by a proxy server occurs when one network user requests a Web page from a remote resource that has recently been retrieved by another network user. Rather than retrieve the same Web page from the same remote resource again, the proxy server may simply deliver the Web page that has been stored on it from the previous request. It should be appreciated that while the use of proxy servers alters the path through which information and communication may travel, such use does not substantially alter the basic functions of the methods and systems described herein.

In general, many methods may be used to assist a user in filling out an electronic form document. One such method is referred to as the "wallet" method, which may be found, for example, at "eWallet" located at http://www.ewallet.com. This method requires a user to download a software application and install it onto his or her computer. The user is then required to input personal information items into the application, including the user's name, address, and credit card information, which is stored on the user's computer for future use. The user is then able to use this "eWallet" application and inputted personal information items to automatically fill out electronic form documents that are affiliated with the "eWallet" application. Whenever the user desires to fill out an affiliated electronic form document, the user opens the "eWallet" application and clicks and drags a virtual credit card from the virtual wallet onto the form document. The "eWallet" application then automatically inserts the inputted personal information items into the document. The click and drag step must be repeated for each page of the electronic form document. The user is then able to review and approve the form document before transmitting it as complete.

Another method for assisting a user in filling out an electronic form document is referred to as the "transactor" method, which may be found, for example, at "Transactor Networks" located at http://www.transactor.net. This method differs from the wallet method in that the user is not required to download or install any software onto his or her computer. Instead, personal information items are input and stored in a database on a remote server, which is then accessed every time an electronic form document is to be filled. This remote server containing the personal information items is accessed through a browser window separate from the browser window containing the electronic form document to be filled. This method thus requires communication between separate browser windows.

A method for filling out an electronic form document using this transactor method is illustrated in FIG. 2. Independent Internet user 202, from a pool of random independent Internet users 201–206, opens a browser window 230 in his or her Internet browser program, depicted by arrow 251. User 202 then enters a request for a Web page containing an electronic form document 240 to be downloaded into browser window 230. This request is processed by the browser program, and a connection, depicted by arrow 252, is made with the appropriate remote Internet resource 210, typically an Internet Web server, selected from a pool of random remote Internet resources 210–212. Remote Internet resource 210 returns an HTML Web page containing electronic form document 240, depicted by arrow 253. This process may include the retrieval of other portions of the Web page from separate remote electronic resources, as described above in the ad server model. User 202 also opens another separate browser window 231 to activate the "transactor" process, typically done through a bookmark. The browser program then makes a connection, depicted by arrow 255, with transactor server 220 to retrieve the user's personal information items 241. Transactor server 220 returns personal information items 241 to the browser program in browser window 231, depicted by arrow 256. It should be noted that the process represented by arrows 254 through 256 may be completed before or after the process represented by arrows 251 through 253. Once both processes are complete, window 231 initiates communication with window 230 to begin the automated fill of electronic form document 240 in window 230. The windows communicate as necessary until form 240 is filled, depicted by double arrow 257. Filled electronic form document 242 is then displayed back to user 202 in browser window 230, depicted by arrow 258. User 202 is then able to review and approve filled electronic form document 242 before transmitting it as complete.

There are, however, several drawbacks to both the "wallet" and "transactor" methods. Both methods require a substantial initial time investment in requiring a user to input all of his or her personal information items. In addition, the wallet method requires the user to download and install software to his or her computer. This is problematic in that the user has no access to this method when he or she uses any computer that does not have the wallet program installed and the user's personal information items inputted. It is not only inconvenient to re-install and re-input items on every computer for which the user has access, but it is practically impossible for a computer being used by a user for the first time to have the user's personal information items. While the transactor method attempts to overcome this deficiency of the wallet method through server-side databases, it requires cross-communication between windows, which is known in the art to compromise user security. In addition, the requirement of retrieving information from a server-side database during window cross-communication significantly slows down the automated electronic form document fill process.

As such, what is desired is a method and system for remote server-based applications to quickly and automatically fill out electronic form documents, thereby relieving the user of the burden of manually inputting data into such form documents and without requiring the user to be on any specific computer and without compromising user security. In other words, what is desired is a method and system which enables a computer user to automatically fill out electronic form documents from any computer or client location in a network at the simple click of a mouse. Also desirable and inherent in such a method and system is the ability to automatically fill out electronic form documents without requiring the user to download or install any type of permanent or resident software on any computer.

SUMMARY OF THE INVENTION

According to the present invention, methods, apparatus, and computer program products are disclosed for constructing and transmitting an executable software module on a personal information server, referred to as a privacy bank server, to a remote computer. The software module is constructed such that once received by a browser displaying a form, it is executed and user data is automatically inserted into the form. In one aspect of the present invention, a method for constructing a shippable software module on a personal information server suitable for execution on a remote computer for inserting data strings into an electronic form is described. A form mapping containing a set of associations between fields in the electronic form ("non-standard fields") and pre-named fields ("standard fields") on the personal information server is retrieved. Each mapping is associated with a registered electronic form. A raw data file containing data strings, each data string corresponding to a pre-named field is retrieved. Each raw data file is associated with a registered user. The form mapping is utilized to attach a data string to the field in the electronic form where the pre-named field and the field in the electronic form have been previously matched or mapped.

In one embodiment, an intended-practice condition associated with each non-standard field in the electronic form is compared to a use-preference condition associated with each pre-named or standard field. A data string is attached to the non-standard field in the electronic form when the intended-practice condition is less than or the same as the use-preference condition of the pre-named field. In another embodiment, the data string is not attached to the field in the electronic form when the intended-practice condition is greater than the use-preference condition of the pre-named field. In yet another embodiment, the form mapping is utilized to attach a data string to the field in the electronic form involving an examination of multiple negotiation objects for either an acceptance and decline message, where each negotiation object results from comparing data relating to the field in the electronic form to data relating to the pre-named field.

In another aspect of the invention, a server for enabling automatic insertion of user information into an electronic form having multiple fields on a remote computer capable of communicating with the server is described. The server contains a memory area storing a multiple raw data profiles where each raw data profile corresponds to a registered user of the privacy bank service. Another memory area stores multiple form mappings, each form mapping corresponding to a particular form registered with privacy bank service by a merchant or third-party vendor. A comparison module compares or "negotiates" user-preference data contained in the raw data profiles with practice-preference data contained in the form mappings. A software module constructor prepares and transmits a shippable program or software module that can be executed on a remote computer thereby inserting data strings into an electronic form on the remote computer.

In one embodiment, the raw data profile includes several standard field names, each standard field name having a corresponding data string and a use-preference data item determined by a registered user. Similarly, each form mapping includes multiple non-standard field names from the electronic form, where each non-standard field name is mapped to a standard field name and has a practice-preference data item. In yet another embodiment, a negotiation history module contains negotiation modules, each negotiation module containing an offer component and either an acceptance component or a decline component.

BRIEF DESCRIPTION OF THE DRAWINGS

The invention will be better understood by reference to the following description taken in conjunction with the accompanying drawings in which:

FIGS. 8A, 8B, 8C, 8D, and 8E are table diagrams showing the field names and format of registered user data in accordance with one embodiment of the present invention.

DETAILED DESCRIPTION

Figure 1:
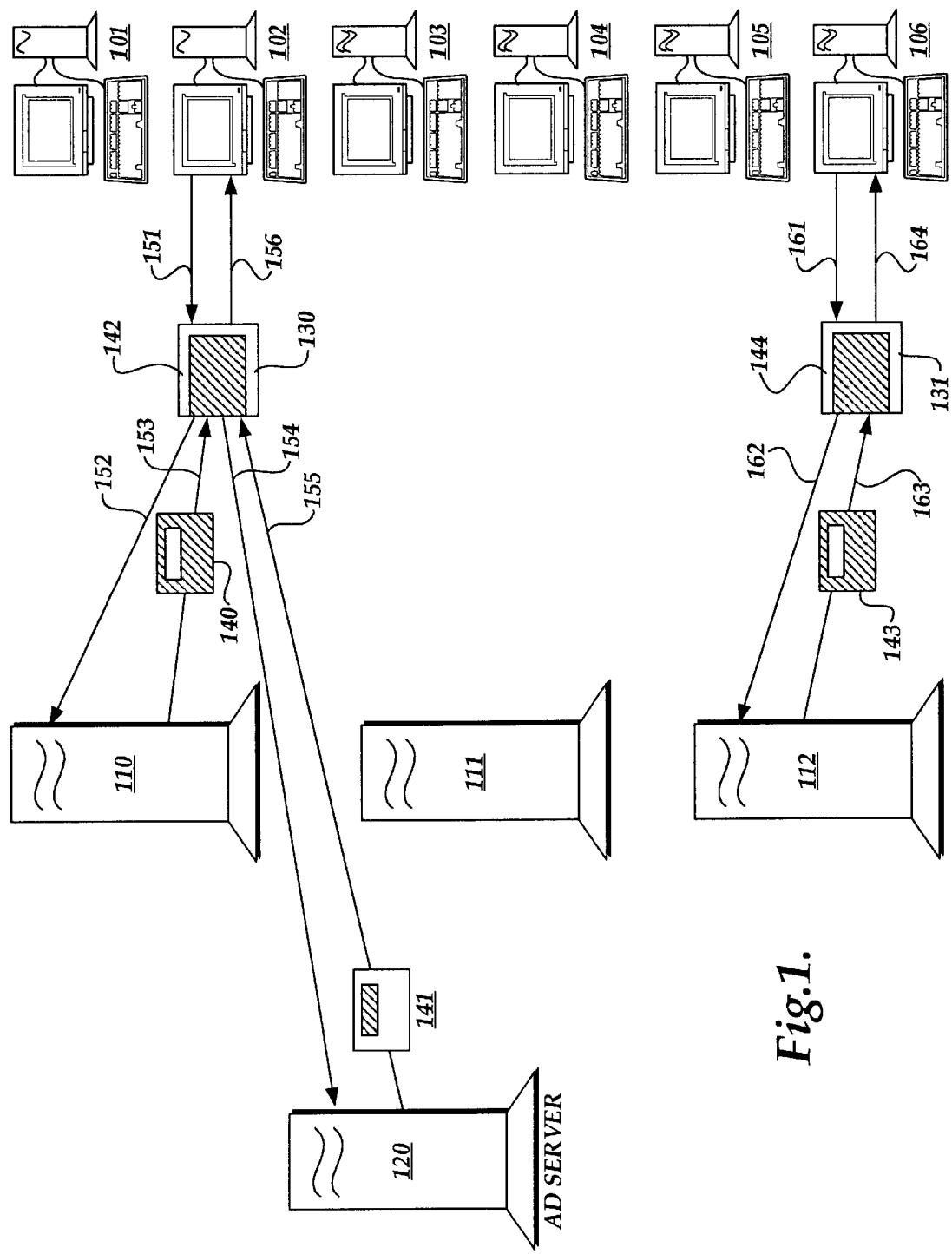
FIG. 1 is a diagrammatical representation of an "ad server" model in accordance with the prior art.
Figure 2:
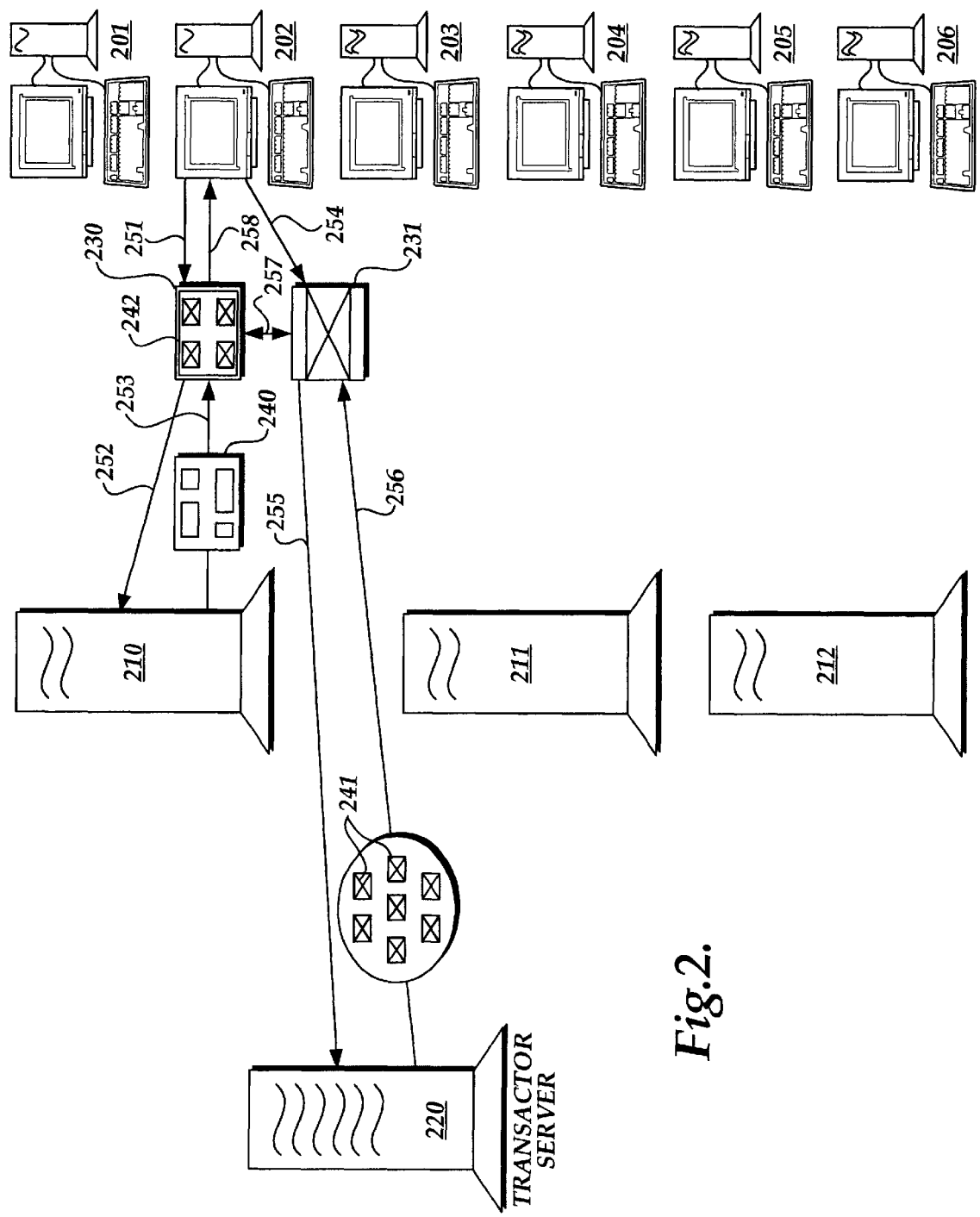
FIG. 2 is a diagrammatical representation of a transactor model in accordance with the prior art.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method and system for automatically filling in electronic forms on a computer and not requiring a user to download or install any resident software on the computer is described in the various figures. As the presence of merchants and services increases on the Internet, electronic commerce or e-commerce will grow. More and more consumers will resort to the Internet, for example, to purchase goods and services. This will typically require the consumer/user to provide at least some data to the merchant typically through filling out an electronic form having various fields, most commonly names, addresses, credit card numbers, phone numbers, etc. For consumers purchasing goods from numerous merchant sites and possibly using different computers (e.g. using a computer at work, using another computer at home, and yet another one while travelling), manually filling in these forms repeatedly can become tedious and inefficient. The present invention seeks to alleviate the burden of filling in electronic forms, while informing the consumer/user of privacy precautions taken by a particular merchant site, and not require the user to download any resident software. Inherent in the latter feature is allowing the consumer to use the processes of the present invention from any computer connected to the network, the Internet in particular.

The present invention uses a remote server or "privacy bank," a novel electronic resource that responds to requests for data by preparing and transmitting a specialized document in the form of a JavaScript. This JavaScript is formed dynamically by the privacy bank upon receipt of the request for data. The JavaScript created by the privacy bank is a "profile" or mapping between field names in a particular form the user needs to fill in at a particular merchant site (e.g. "www.fishermanstore.com" ) and standardized field names stored in the privacy bank server. Once the user's browser program is served this profile from privacy bank, most of the fields in the fishermanstore form are automatically filled in. In the described embodiment, the user becomes a member of the privacy bank resource by providing personal information, also referred to as the raw data, to privacy bank once. This raw data can be updated from time to time by the user if desired. In another embodiment, the user can enter privacy rules or requirements once when initially becoming a member. The user does not need to download any software from privacy bank or any other resource. In the described embodiment, the merchant (e.g. The Fisherman Store) becomes an affiliate member of the privacy bank network by providing a sample document of its form or forms. Privacy bank can then build a mapping between fields in the merchant's form and the standardized fields in its own database. These processes, components, and related data constructs are described in the various figures below.

Figure 3A:
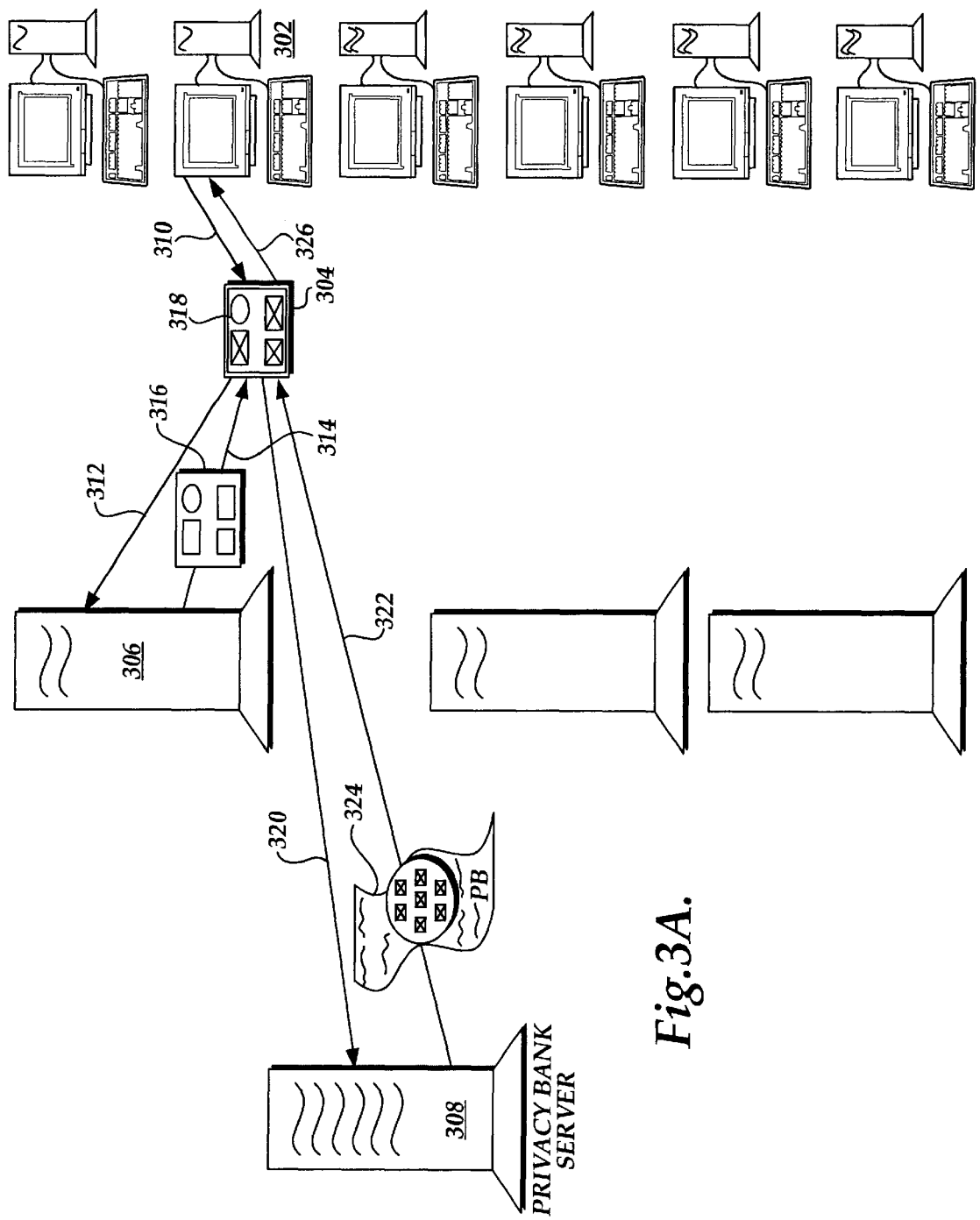
FIG. 3A is a diagrammatical representation of a system for automatically filling in electronic form documents in accordance with one embodiment of the present invention.

FIG. 3A is a block diagram of a system for automatically filling out electronic form documents in accordance with one embodiment of the present invention. A number of end-user computers are shown on the right side of the diagram. These computers can be client computers in a network with access to the Internet or be part of an intranet. In the described embodiment an end-user computer 302 is a stand-alone computer with access to the Internet and contains an Internet browser program, a browser window for which is shown at 304. In the center of the diagram is a number of Web servers. A particular Web server 306 is a server for a merchant Web site, such as www.fishermanstore.com to which users or consumers can visit to purchase goods online over the Internet. On the left side of the diagram is a specialized electronic resource referred to in the described embodiment as a privacy bank server computer 308, also connected to the Internet.

The process of automatic electronic form completion begins with a user downloading the form from a Web site such as fishermanstore site. A process of a user becoming a member and logging into the privacy bank server is described in greater detail in FIG. 5. Returning to FIG. 3A, a user/consumer on computer 302 ("user 302") opens a browser window 304 in an Internet browser program such as Netscape Navigator or Internet Explorer, depicted by arrow 310. User 302 then goes to www.fishermanstore.com shown by arrow 312 via the browser and decides to purchase goods. User 302 then downloads from the Web site contained on Web server 306 an electronic purchasing form that needs to be completed as depicted by arrow 314. A purchasing form 316, typically an HTML document, is returned and downloaded into and displayed in browser window 304. At this juncture, user 302 would normally have to "manually" fill in each field in purchasing form 316. Much of this information is typically standard: name, address, phone number, payment method, user email address, etc. In accordance with one embodiment of the present invention, user 302 can "click" on a privacy bank icon or button in form 316 and have the form automatically filled in.

As stated earlier, it is assumed in this discussion that www.fishermanstore.com is registered with and thus an affiliate member of the privacy bank service assessable from privacy bank server 308. Being an affiliate member of the privacy bank service, purchasing form 316 contains a privacy bank icon or button 318. By clicking on privacy bank icon 318, user 302 essentially completes a process for automatically filling in form 316 by transparently transmitting a completed form to the privacy bank service on server 308, depicted by an arrow 320. The information needed for filling in the form is transmitted to user 302 once form 316 (an HTML document) is parsed, which occurs when form 316 is downloaded. This process is described in greater detail in FIGS. 4A and 4B. User 302 informs privacy bank server 308 of the identity of the user and of which Web site and which form on that Web site (if more than one) the user wishes to have filled in. This information is transmitted to privacy bank server 308, unbeknownst to user 302, when form 316 is downloaded. Techniques for accomplishing this are described below. Once privacy bank server 308 receives a request from registered user 302 (by virtue of an external link in form 316 executed when the form is parsed by user 302), it begins preparing information needed to fill in form 316 on user computer 302. A process of preparing the information sent back to user computer 302 and browser 304, depicted by arrow 322, is described in greater detail in FIGS. 6 and 7. In the described embodiment, the information sent to user computer 302 is a JavaScript program 324 referred to as a "profile." Explained briefly, this profile contains a mapping of privacy bank standardized fields and fields in purchasing form 316 and "raw," generally personal, data associated with user 302. The content of this profile and JavaScript program in general is described in greater detail in FIGS. 7A and 7B below. Once received by the browser program on user computer 302, the filled out purchasing form 316 is displayed to user 302 as depicted by arrow 326. This occurs when user 302 presses or clicks on privacy bank icon 318. The information needed to complete form 316 is already resident in the browser program. At this juncture, user 302 can decide whether to proceed with submitting the form (typically after filling out a few more fields such as which items to purchase, quantity, etc.) or declining to submit the form, perhaps after reviewing the fishermanstore's Web site privacy safeguards or for any other reason.

Figure 3B:
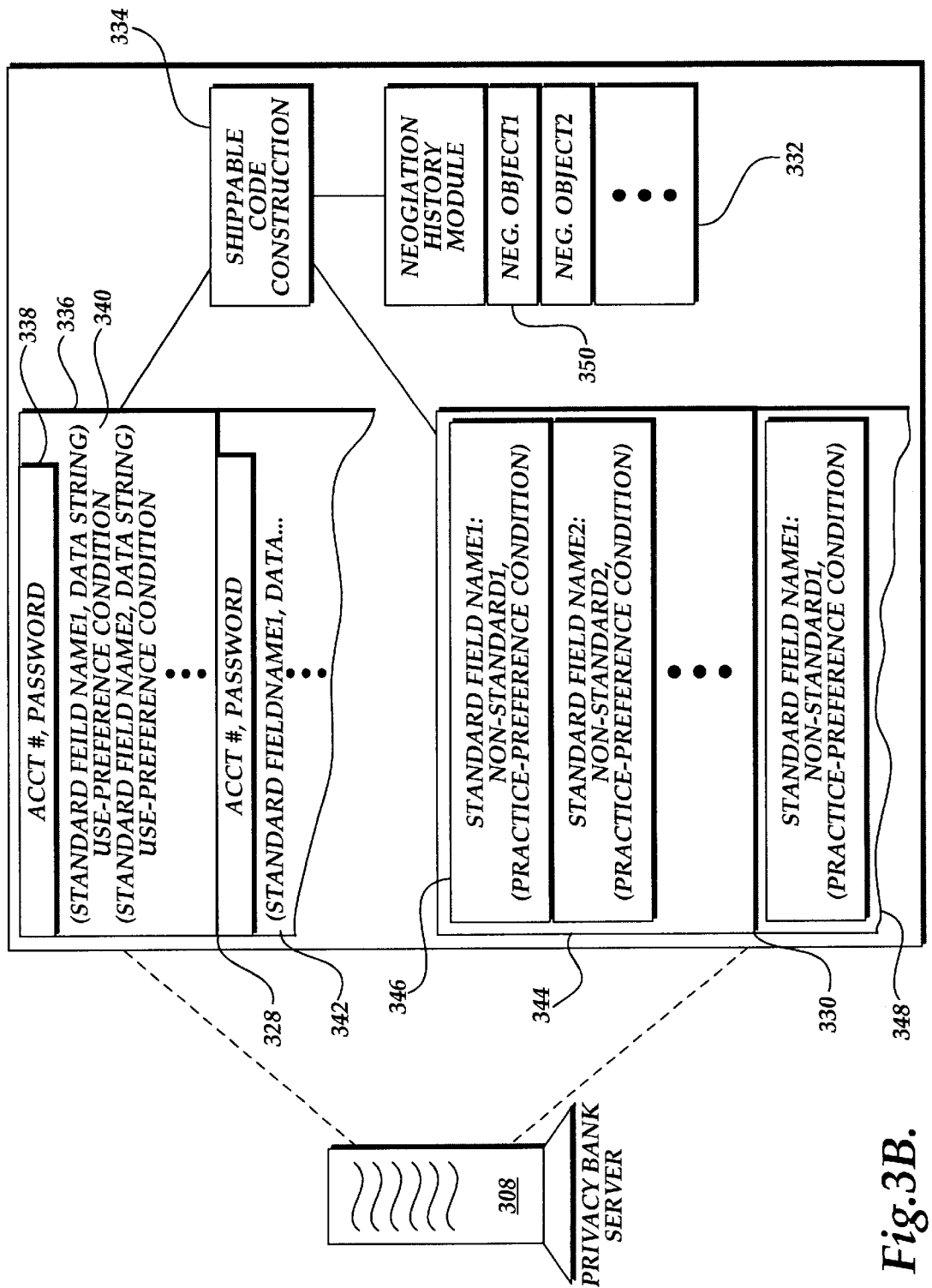
FIG. 3B is a block diagram showing components of a server enabling the automatic insertion of data in to an electronic form on a remote computer in accordance with one embodiment of the present invention.

FIG. 3B is a block diagram showing components of a privacy bank server enabling the automatic filling in of electronic forms on a remote user computer. A privacy bank server, such as server 308 in FIG. 3A, contains several functional and storage components needed for compiling the data needed for filing in a form, such as form 316. Shown in FIG. 3B are four major components of a privacy bank server in the described embodiment. These components and storage areas include a raw data profile storage area 328, a form mapping storage area 330, a negotiation history module 332, and a shippable code constructor 334. Raw data profile storage area 328 contains sets of data relating to registered users of the privacy bank service, one set or profile shown in area 336. A registered user has a unique account number that can be used as an identifier and a password, shown in an area 338. The standard field names set by the privacy bank service, discussed in greater detail in FIGS. 8A, 8B, 8C, 8D, and 8E, are paired with a user entered data string (such as first name or home street address), followed by a use-preference condition. The use-preference condition is used in negotiation history module 332 and is discussed in greater detail in FIG. 7 below. This data is contained in an area 340. Another profile for another registered user is shown in an area 342. Each registered user has a similar raw data profile.

Form mapping area 330 includes multiple form mappings, an example of which is shown in an area 344. Each electronic form that is registered with the privacy bank service by an online merchant or seller (i.e. an affiliate member) has a form mapping. A privacy bank standard field name, as discussed below in FIGS. 8A, 8B, 8C, 8D, and 8E, and as mentioned above in area 340, is matched or mapped with a "non-standard" field name from the electronic form registered with the service. For example, a non-standard field name for a person's last name could be "Last Name," "Surname" or simply "Last." Different forms use different variations of names for this field and for other fields. This would be mapped against the privacy bank "standard" field name, which in the described embodiment, is "Person-Name.Last." Also contained in area 346 is a practice-preference condition provided by the online merchant or seller when registering the form. As with the use-preference condition in area 340, this condition is used by negotiation history module 350 and shippable code constructor 334, and is discussed in greater detail below in FIG. 7. Another mapping 348 having the same format for another registered form follows area 344.

Negotiation history module 332 is used to determine which fields in the electronic form will be automatically filled in by the privacy bank server. A process associated with negotiation history module 332 is described in greater detail in FIG. 7. Module 332 includes multiple negotiation objects, an example of which is shown in an area 350. In the described embodiment, each negotiation object corresponds to one "non-standard" field in the form. Described briefly, negotiation object 350 contains information as to whether the field in the form should be filled in based on privacy and use preferences set by the user (as conveyed in use-preference condition in area 340) and compared to intended practices (as conveyed by practice-preference condition in area 346). This comparison is performed in the negotiation history module, which includes a negotiator or comparator for comparing these conditions.

Specific conditions in the described embodiment are described below. If it is determined that the non-standard field in the form will be filled in, a data string, shown in area 340, will be included in negotiation object 350. Shippable code constructor 334 accesses component 332 and storage areas 328 and 330, to derive a software module to be transmitted to a user computer. In the described embodiment, the software module is a JavaScript program which is transmitted to and executed by a browser in the user computer, thereby inserting the data strings into the form fields.

Figure 4A:
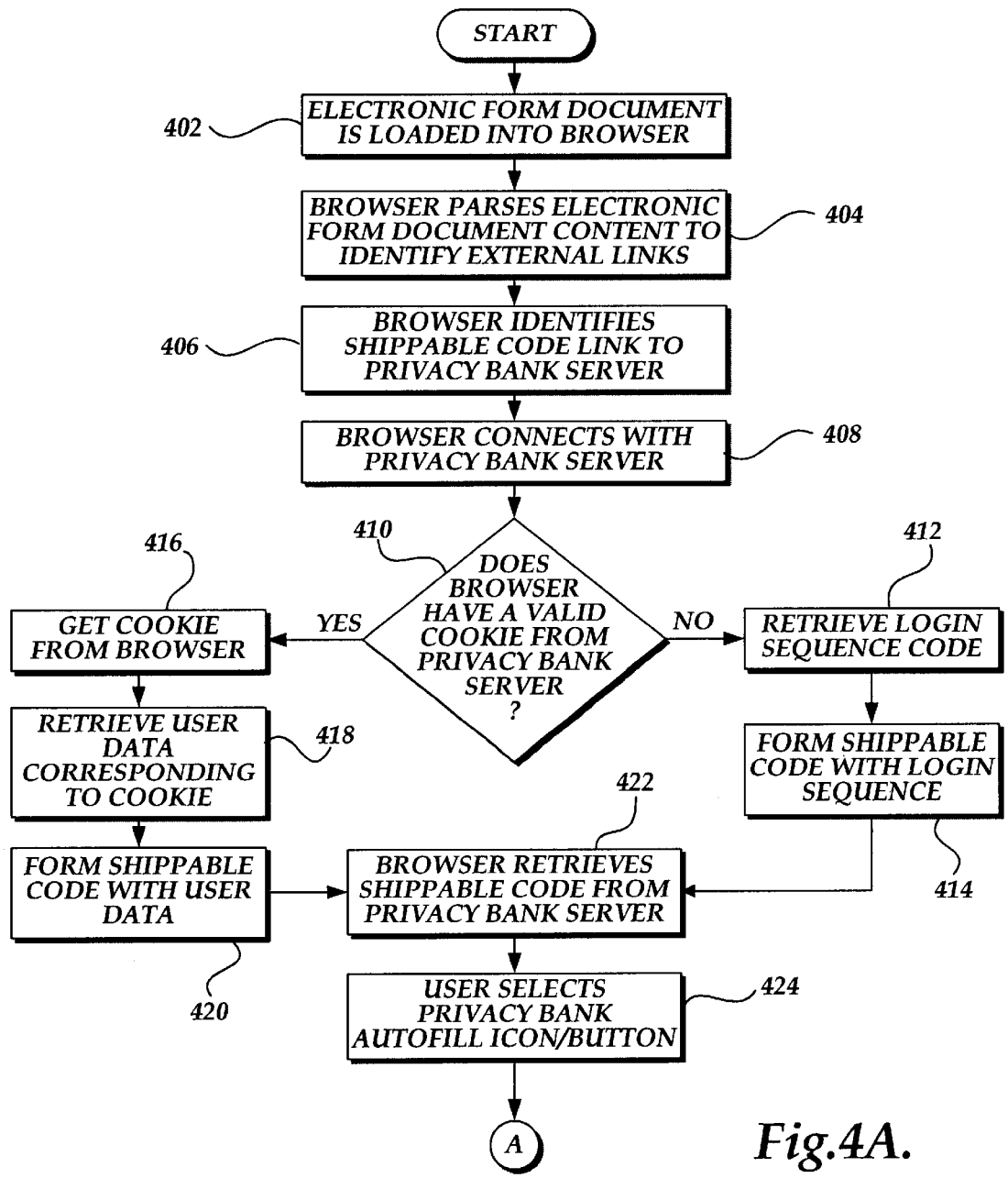
FIGS. 4A and 4B are flow diagrams of a process for automatically filling in an electronic form document in accordance with one embodiment of the present invention.
Figure 4B:
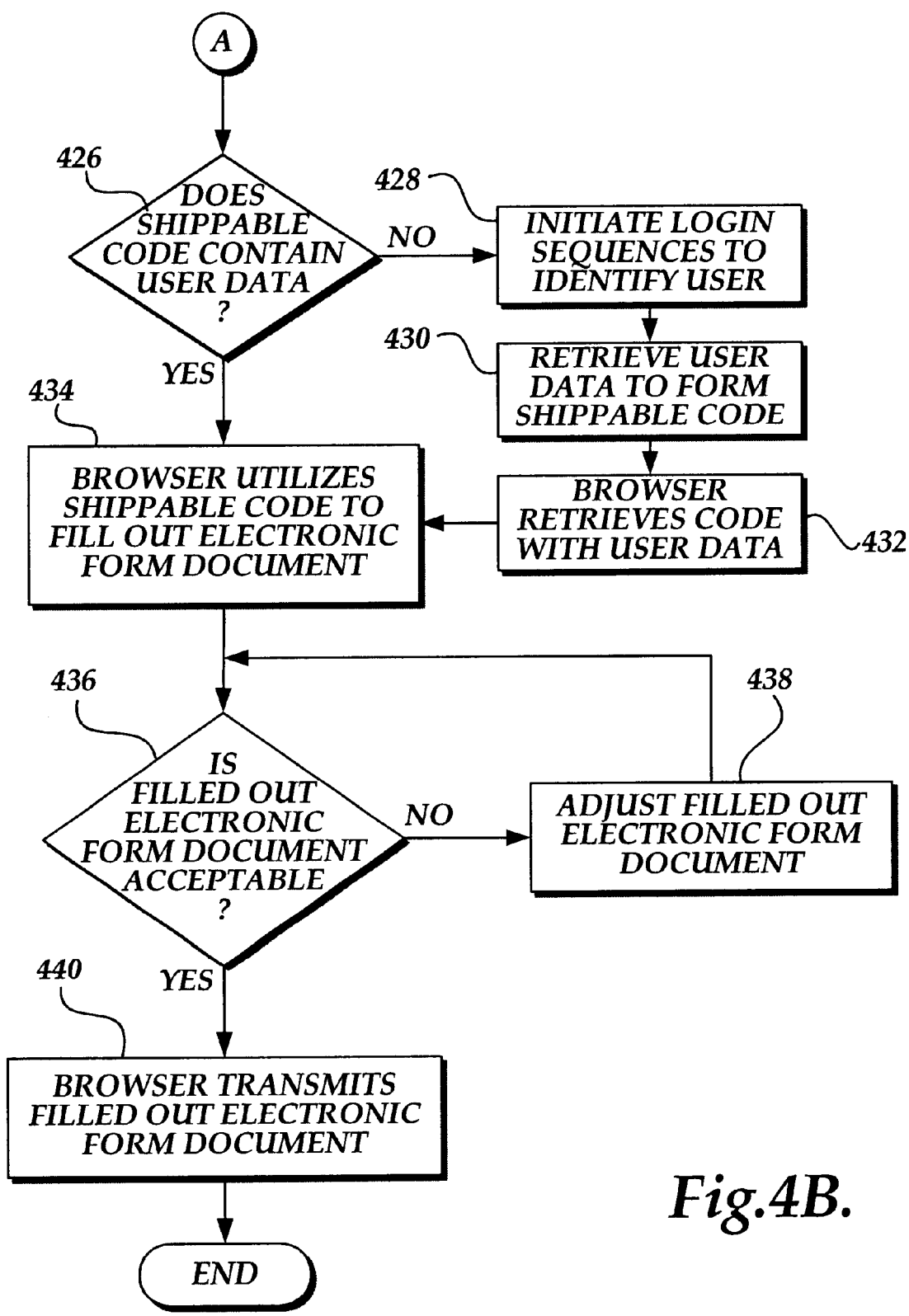

FIGS. 4A and 4B are flow diagrams of a process for automatically filling in electronic forms in a computer network in accordance with one embodiment of the present invention. The process described below can be performed in a configuration of servers and computers as described in FIG. 3A above. At a step 402 an online user/consumer desiring to purchase certain goods on the Internet downloads an electronic form for making a purchase into the user's browser program. At step 404 the browser parses the electronic form content, typically an HTML document, to identify all external links. As is commonplace for Web pages, the HTML contains links to other external Web sites from which content or other types of data is retrieved. In many instances, a Web page is a composite of different components from various sites embedded in a core HTML document. An example is an external link to an ad server to retrieve a banner ad component of a core HTML document. In this case, the electronic form can be seen as a core HTML document. This parsing is done automatically by the browser and is a well known feature.

At step 406 the browser identifies an external link to the privacy bank server. In the described embodiment, this link will necessarily be present since the Web site is an affiliated site of the privacy bank service network of registered sites. A description of what "registered" implies in this context is described in greater detail below. At step 408, the browser executes the external link to connect the browser to the privacy bank server. The external link is referred to in the described embodiment as a shippable code link to the privacy bank server. The shippable code in this context is a JavaScript program that is transmitted from the privacy bank server to the user computer and browser. This shippable code enables the electronic form to be filled in automatically in a process that is described in greater detail below. At step 410, once the privacy bank server has been contacted via the shippable code link in the electronic form, the privacy bank server determines whether the user computer or browser has a valid state identifier, referred to as a "cookie", previously assigned to it by the privacy bank server. A cookie is an identifier assigned by a Web site, whether a Web server or a server such as the privacy bank server, to a user/visitor when the user visits the Web site for the first time in a given session (the time from which a user logs onto the Web and the time he or she exits the Web by exiting the browser). The cookie, assigned by a Web site, belongs to a particular user. In the described embodiment, the user keeps this cookie during its session (a temporary cookie) and if the user goes back to that Web site during that session, it shows the Web site that cookie from which the Web site can identify the user and retrieve characteristics of that user from its data repository. As is known in the art of Internet application programming, cookies can also be permanent in that they subsist with a user after the user has logged off the browser and can be used again in a new session. The concept and implementation of cookies themselves are well known in the field of Internet and, more generally, computer network programming.

If the privacy bank server determines that the user computer or browser does not have a valid cookie, it implies that the user has not yet logged into the privacy bank service. If so, control goes to step 412 where the privacy bank server retrieves a login sequence code. This code will trigger a login sequence and enable the user to log in to or register with the privacy bank service at a later step in the process, as described in greater detail below. At step 414, the privacy bank server forms a completed package of shippable code containing the retrieved login sequence code, such that the login sequence will be triggered at a later step in the process. At step 422, the browser retrieves this completed package of shippable code from the privacy bank server. The shippable code is then stored in the browser residing on the user's computer, and is executable upon a user trigger, which is described in greater detail below.

If the privacy bank server determines that the user/browser making contact by downloading the electronic form and executing the external link has a valid cookie, control goes to step 416 where the privacy bank server gets and reads the user's cookie. In this context, having a valid cookie indicates that the user has already gone through the login sequence recently, for example during the existing Internet session, and thus it is not necessary for the user to go through the login sequence again. By reading the user's cookie, the privacy bank server can determine who the user is and thus can retrieve the user's raw data stored by privacy bank. The contents and format of this raw personal data is described in greater detail in FIGS. 8A, 8B, 8C, 8D, and 8E below. At step 418, the privacy bank server retrieves the user data for the user identified by the valid cookie. The privacy bank server couples this user data and an identifier, such as a URL (uniform resource locator), to determine how the electronic form document should be filled. At step 420, the privacy bank server forms a completed package of shippable code (item 324 in FIG. 3A) containing the user data that will be used to fill out the form document. In the described embodiment, this shippable code, referred to as a profile, is in the form of a JavaScript program. This shippable code is formed from information in the privacy bank memory that will enable the form document to be filled out automatically at a step later in the process. At step 422 the browser receives the shippable code, or profile, from the privacy bank server, and now has access to it on the user computer, if desired by the user. This profile is stored in the browser residing on the user's computer, and is executable upon a user trigger.

Assuming the user wants to have the electronic form automatically filled out using privacy bank, he or she executes a user trigger. In the described embodiment, this trigger occurs when the user clicks on an "autofill" button contained in the form and associated with privacy bank at step 424. By clicking on the autofill button, the user allows the browser to execute the shippable code or profile stored thereon. At step 426, the shippable code determines whether it contains user data which would permit it to fill out the form document. If user data is contained within the shippable code residing on the browser, control goes to step 434 where the browser utilizes the shippable code and user data to fill out the electronic form document. Of course, user data being present in the shippable code is dependent upon the browser having a pre-existing valid cookie when the form document was initially retrieved, as described above.

If, however, user data is not contained within the shippable co residng on the browser, control goes to step 428 where the login sequence is initiated in order to identify the presently unknown user. The shippable code utilized by the browser in this step contains the login sequence code, which is a result of the browser not having a pre-existing valid cookie when the form document was initially retrieved, as described above. The login process of step 428 is described in greater detail in portions of FIG. 5. Once the user completes the login sequence at step 428, the privacy bank server assigns a cookie to the user/browser thereby enabling it to recognize the user and messages from the user's browser in subsequent transactions. At step 430, the privacy bank server retrieves the user data for the identified user, couples this user data and an identifier, such as a URL (uniform resource locator), to determine how the electronic form document should be filled, and forms a completed package of shippable code containing the user data that will be used to fill out the form document. This step is substantially similar to steps 418 and 420, as described above. At step 432, the browser receives the shippable code, or profile, from the privacy bank server, and now has access to it on the user computer. This shippable code now contains user data that allows the form document to be filled out automatically. At this stage, control proceeds to step 434, where the browser utilizes the shippable code and user data to fill out the electronic form document. Further input from the user, such as re-clicking on the "autofill" button, is not required. In other words, once the user properly completes the login sequence, the form is then filled out automatically, and it is not necessary for the user to click on the "autofill" button again.

At step 436, the user visually examines the filled out form and the privacy features offered by the Web site and decides whether the form is acceptable. If the user finds that the form needs further adjustment, the user adjusts the document at step 438. This may be done manually, or through any supplemental automated process, such as a client-based macro. This can involve filling in fields that could not be filled in by the profile sent by the privacy bank server (in other words, fields that could not be filled out from the raw data). Such fields can include, for example, which items being purchased and the quantity of items. It can also include updated personal information such as a new address or credit card number. In this case, the user simply types over the information already in the fields. Control then returns to step 436, which is satisfied presumably after going through step 438 once. At step 440 the browser submits the filled out electronic form eventually sending it to the merchant's Web server once the user clicks on a Submit form button in the browser window. In the described embodiment, the filled out form is first sent to the privacy bank server unbeknownst to the user or at least transparent to the user. The completed form is received and examined by the privacy bank server which updates its raw data repository to reflect any changes the user may have made to his or her personal information. The privacy bank server then posts a message back to the user computer (according to HTTP protocol the server must send a message back to the user computer when it receives an HTML document from it). In the described embodiment, the message it sends back or posts to the user's browser is similar to a "Click Here To Continue" type screen to the user. Hidden behind this message is the completed form that was sent to the privacy bank server. Presumably, the user will click to continue and by doing so transmits the hidden completed form to the merchant's Web server. In other preferred embodiments, the completed form is sent to both the privacy bank server and the merchant's Web server at the same time. In yet another preferred embodiment, the completed form is posted automatically from the privacy bank server directly to the merchant's site without any additional input from the user. At this stage the automatic form filling process is complete.

Figure 5:
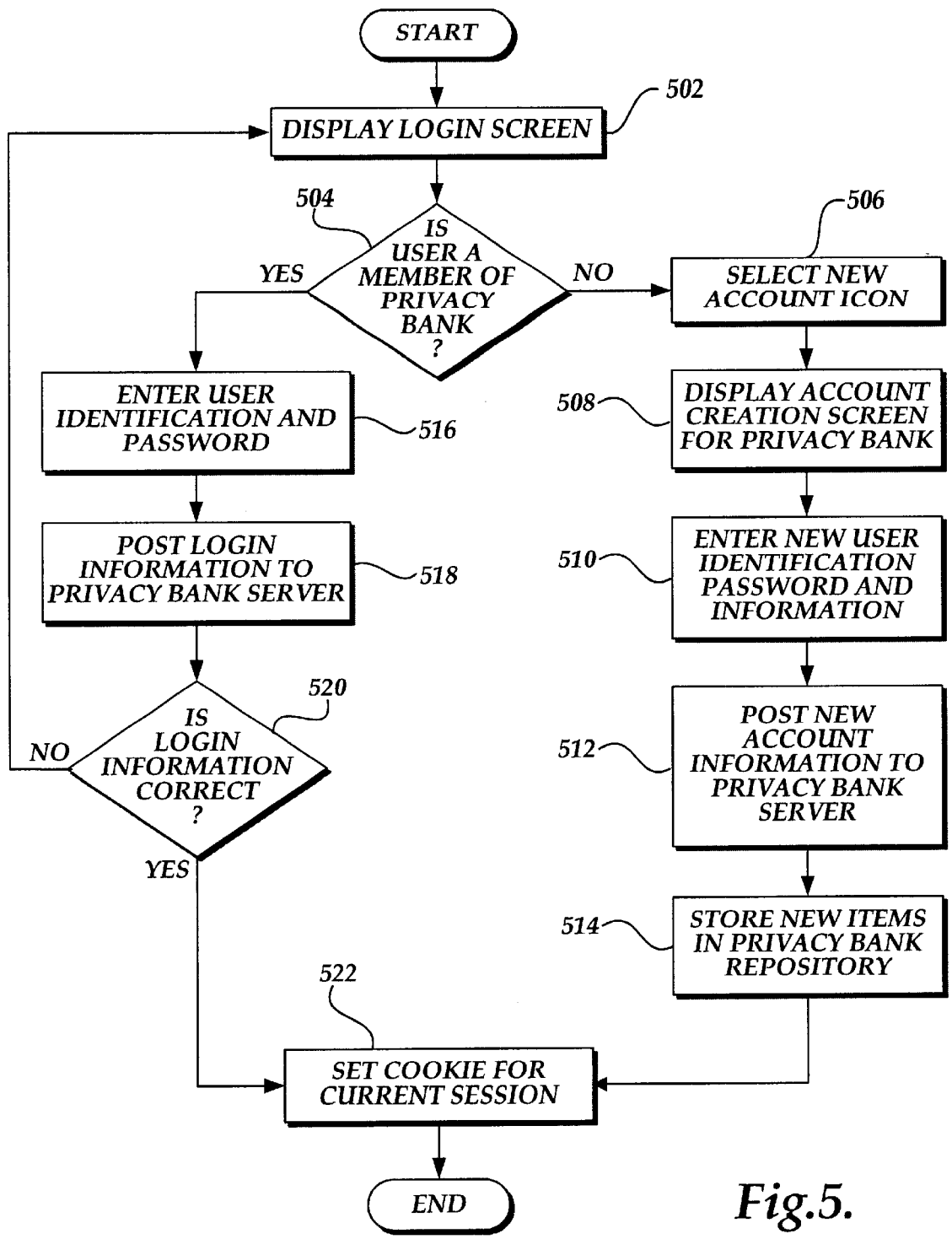
FIG. 5 is a flow diagram of a process for an initial user session using the service for automatic electronic form completion in accordance with one embodiment of the present invention.

FIG. 5 is a flow diagram of a process for entering new users into the privacy bank service or logging in existing members thereby allowing them to use the service in accordance with one embodiment of the present invention. Portions of FIG. 5 show in greater detail step 428 of FIG. 4B where the login sequence is initiated to identify the user. Once the privacy bank server determines that the user does not have a valid cookie, the server inserts a login process for the user into the shippable code, whereby an account may be created if the user does not already have one. This is done because it is assumed that if the user has not yet been assigned a cookie from privacy bank for the user's current session, he or she has not yet logged onto the privacy bank service or is possibly not a registered member. The first event that occurs in the login sequence is the privacy bank server displaying a login screen in the user's browser window, as depicted in step 502. At step 504 the user decides whether or not he or she is a privacy bank member, and proceeds to utilize the appropriate section of the login screen. One section of the login screen requires the user to input a user identification and password for an existing account, while another section permits the user to select an icon that routes the session to an account creation screen.

For account creation, in the described embodiment, the user selects a "New Account" icon on the login screen, as depicted in step 506. At step 508, a privacy bank account creation screen is then displayed. At step 510, the user enters his or her user identification, a password, name, other information, and high-level privacy preferences into the account creation screen. Essentially the user is configuring the account and personal information items that will be stored for him or her in the privacy bank repository. The information inputted into this newly created account is then posted back to the privacy bank server, as depicted in step 512. At step 514, the privacy bank server accepts the new account information and establishes a location for the new user in the privacy bank repository. The newly inputted information is then recorded in this repository location. The privacy bank server then sets a cookie for the current user session, as depicted in step 522, and the process ends.

For existing user login, in the described embodiment, the user enters his or her existing user identification and password, as depicted in step 516. At step 518, this login information is posted back to the privacy bank server, which then proceeds to evaluate the information. At step 520, the privacy bank server determines whether or not the posted information is correct, that is, whether or not it corresponds to a valid user identification with the proper password. If the posted information does not correspond to a valid user identification and password, then the attempted login fails, and the process reverts to step 502, where a new login screen is displayed. If the posted information is correct, then the login is successful, and the process proceeds to step 522. The privacy bank server then sets a cookie for the current user session, as depicted in step 522, and the process ends.

Figure 6:
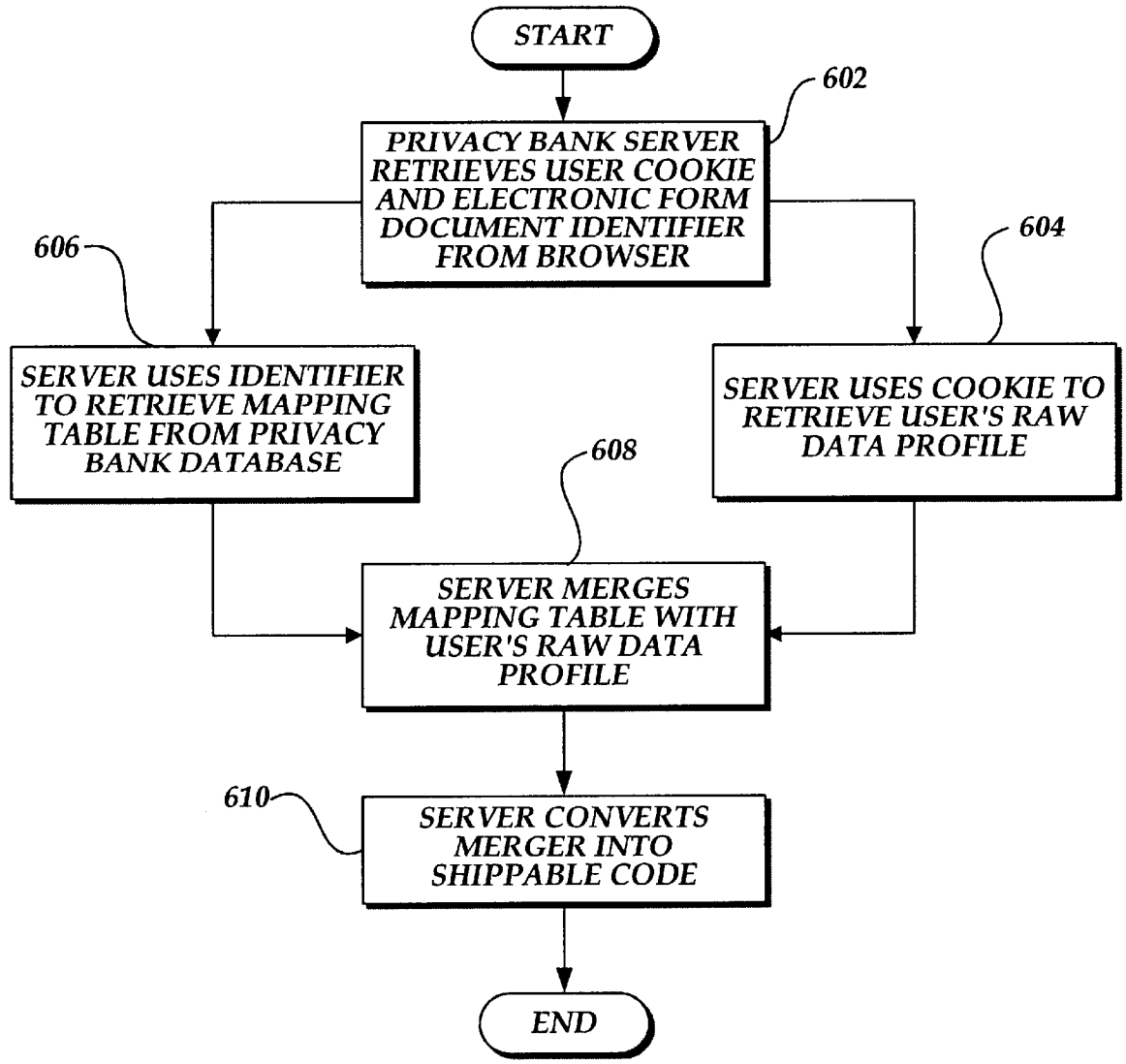
FIG. 6 is a flow diagram of a process for constructing and transmitting a shippable code segment from a server to a user computer in accordance with one embodiment of the present invention.

FIG. 6 is a flow diagram of a process for deriving the parts needed in constructing a shippable code segment or profile to be posted to the user in accordance with one embodiment of the present invention. It describes a process leading up to step 416 of FIG. 4A in which the browser retrieves the shippable code posted from privacy bank in greater detail. Recall that the user's browser parses the electronic form to identify and then execute any links to external resources to obtain external components to the core HTML document. In the case of the privacy bank server (assuming the merchant Web site from which the electronic form is being downloaded is an affiliate member of privacy bank), the server receives and begins to perform operations pursuant to the link from the user. At step 602 the user retrieves two items: the user cookie and the identifier of the electronic form the user presumably wants to fill out. The user cookie (assigned to the user by the privacy bank server from when the user logged onto the service) informs the privacy bank server of the identity of the user. The identifier of the electronic form contains an identifier of the merchant's Web site, and the specific form on the site that has been downloaded by the user, also in the form of a URL in the described embodiment. In many instances there may only be one form on the Web site.

At step 604 the privacy ban server uses the user cookie to retrieve the user's raw data from the privacy bank memory. The configuration and content of the raw data is described in greater detail in FIGS. 8A, 8B, 8C, 8D, and 8E below. The raw data is a set of data items very likely needed to fill out common electronic purchasing forms. As is described in greater detail below, each raw data item corresponds to a particular privacy bank standard label or name. At step 606 the privacy bank server uses the URL or other identifier for the specific form to be filled out to retrieve a mapping of each field name in the electronic forms (i.e. the legacy names) to privacy bank standardized names. This mapping or field name matching is performed when a merchant becomes an affiliate member of the privacy bank service. At that juncture the merchant submits one or more forms to privacy bank which then examines each field name in the forms and matches it with a privacy bank field name. In the described embodiment, if there is a legacy name that does not have a matching privacy bank field name, the privacy bank user raw data configuration can be updated if it is believed that the particular legacy field name may begin appearing on other forms. Otherwise, it is left for the user to manually fill in as described in step 424 of FIG. 4A.

At step 608 the server merges the retrieved name map and the user's raw data through a join type operation. The merger between two tuples: the legacy name/privacy bank name tuple and the privacy bank name/raw data value tuple is described in greater detail below. The outcome of this merger is a series of tuples matching a legacy name with a raw data value associated with the user. In other preferred embodiments this merger can be performed using other data constructs and operations. However, the outcome is a pairing of a legacy field name and a raw data value. At step 610 the series of tuples from the merger is converted to a shippable code. In the described embodiment the shippable code is in the form of a JavaScript program which is posted to the browser on the user computer. Normally, browser programs have a JavaScript component that is manipulable by JavaScript commands. These JavaScript commands in the shippable code are used to fill in the electronic form on the browser, a technique well known in the field of Internet and Java programming. It useful to note here that the form is actually filled in at the user computer via the browser using the JavaScript commands in the shippable code. The form is not filled out on the privacy bank server; the information for filling out the form is constructed there but is then posted to the user computer. At this stage the process of deriving the shippable code on the privacy bank server is complete.

Figure 7:
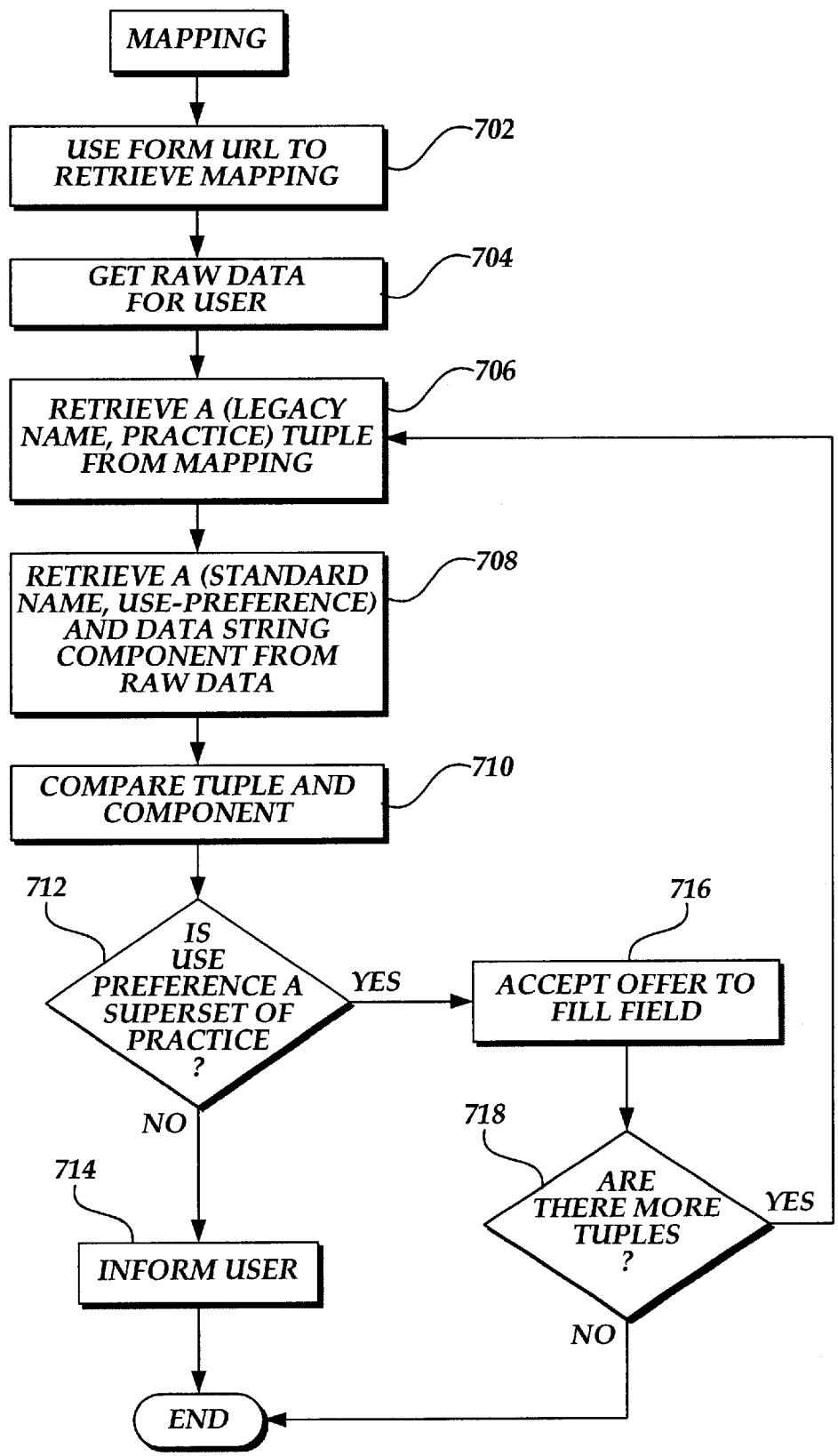
FIG. 7 is a flow diagram of a process for mapping through which form names are mapped to a user's raw data values in accordance with one embodiment of the present invention.
Figure 8E:
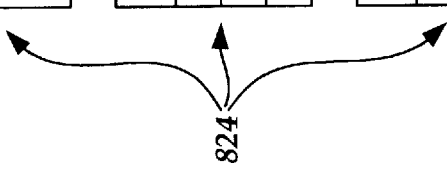

FIG. 7 is a flow diagram of a process for mapping through which form names are mapped to a user's raw data values in accordance with one embodiment of the present invention. As described above, at step 702 the privacy bank server uses the form URL or other identifier to retrieve a mapping for the form that maps a legacy name with a privacy bank standardized name. The mapping also contains one or more practices for each field name, described in greater detail below. This mapping is created when a merchant or service provider decides to become an affiliate member of the privacy bank service. During the registration process the merchant tells privacy bank which forms it wants to register and the field names in those forms, which are then paired with privacy bank standardized names. At step 704 the user cookie is used to obtain the user's raw data, which includes actual data values and preferences associated with each data value. The practices mentioned above associated with legacy names and the preferences associated with user raw data values are stated in terms of conditions. In the described embodiment, there are various conditions, such as marketing (targeted), system administration, personalization, research and development, and completion of activity (i.e. ordering). Other embodiments can more or fewer conditions.

When a merchant registers with the privacy bank service, it must state what conditions for which it will use each legacy field. For example, for the field "Last Name" it may state that its practice will be to use this field for "personalization" and "completion of activity," and nothing else. For a "Method of Payment" field, it may state that its practice will be to use this field for "completion of activity," "research and development," and "administration" only. In this manner, the merchant will build a list of (legacy field name, practice) pairs stored in the privacy bank server. Similarly, when a user becomes a member of the privacy bank service, he or she is required to provide the raw data values (specific fields for the raw data are described below) and corresponding preferences, also stated in terms of conditions. They are called preferences because from the user's point of view they indicate a privacy or use threshold. For example, a user can require that her last name can only be used for "personalization," " completion of activity," and "system administration," thereby excluding its use for targeted "marketing" for example. In the described embodiment, if a user does not specify a preference condition, the data item is not to be released, such as a social security number or a mother's maiden name.

At step 706 the privacy bank server retrieves a single (legacy name, practice) pair and its corresponding standardized privacy bank name from the form mapping retrieved at step 702. In the described embodiment, this pair can be the first form field in the merchant's online form. At step 708 the server retrieves a corresponding (standardized privacy bank name, preference) pair from the user's raw data "file." The privacy bank name in this pair should match the privacy bank name in the pair retrieved at step 706:

[(legacy name, practice), PB Name 1]: [PB Name 1, preference]

At step 710 the privacy bank server compares the merchant's practice conditions on the left with the user's preference conditions on the right. For example, for the last name field, the merchant has specified that its practice is to use this data item for the conditions "personalization" and "completion of activity." The user has specified she will only allow her last name to be used for the conditions "personalization," "completion of activity," and "system administration." The merchant's conditions and the user's conditions are compared. At step 712 the privacy bank server determines whether the merchant's form field should be filled in taking into account the user's privacy threshold for that field. In the described embodiment this is done by determining whether the user's preference conditions is a superset of the merchant's practice conditions. That is, does the merchant intend to use the user's last name for anything other than what the user has specified. In the last name example, the user's preferences is a superset of the merchant's practices: "personalization," "completion of activity," and "system administration" includes at least all of "personalization" and "completion of activity."

If the user's preferences are not a superset of the merchant's practices, control goes to step 714 where a message is displayed to the user indicating that the field will not be automatically filled in because the merchant may use that information in ways the user has not authorized. In the described embodiment, if one field in the form meets this condition, none of the fields in the form are filled in and the process is complete. In other preferred embodiments, the user has the option to fill in the field manually and have the privacy bank service proceed with the remaining fields.

If the user's preferences are a superset of the merchant's practices, control goes to step 716 where the field is filled in with the raw data value. Steps 710 and 712 can be seen as a two-step negotiation process. The merchant form, seen as an "information buyer," makes a proposal to the user, the "information seller." The proposal is essentially in the form of what data item the information buyer wants and what he intends to use it for. This is the first step in the negotiation process where the privacy bank server acts as a negotiator. The user gets the proposal and checks whether the merchant's conditions exceed what the user's preferences. In other words, the user checks whether the merchant intends to use the data item for purposes not specifically allowed by the user. If the merchant's practice conditions are acceptable (by performing the superset test in step 712), the user sends an acceptance to the merchant, at which point the raw data value is retrieved and associated with the legacy field. If the merchant's conditions are not acceptable, the user essentially sends a "not accepted" message to the merchant through the negotiator without a raw data value. This completes the second step in the negotiation process. Each two-step negotiation is viewed as an object which is later used to construct a JavaScript program (the shippable code) using standard Java programming techniques.

At step 718 the server checks whether there are any other (legacy name, practice) pairs in the merchant's form. If there are more legacy fields, control returns to step 706 and the process repeats. If there are no more fields to be filled in, the process is complete. At this stage there is a series of objects or a history of negotiations that has been derived from the mapping process. These series of objects are then used to construct a JavaScript program. In the described embodiment, all the objects will have an acceptance from the user and thus a raw data value attached which is included in the JavaScript profile sent over to the browser/user. In other preferred embodiments, some of the objects can have a "not accepted" or declined message indicating that a particular field in the form will not be filled in and thus not have a raw data value. As mentioned above, in the described embodiment if one of the fields in the form cannot be filled in because the merchant's practices exceed the user's preferences, the entire form is not filled in. The shippable code or profile sent to the user represents a series of (legacy field name, raw data value) pairs. without any reference to preferences or practices, all the negotiations for the data values having been performed on the privacy bank server.

FIG. 8 is a high-level table diagram showing how fields containing the raw data and preferences for a user are organized on the privacy bank server in accordance with one embodiment of the present invention. A top-level User table 802 has four columns: User 804, Category 806, Type 808, and Short display name 810. User Table 802 has four areas of data under column User 804 represented by four rows: Home 812, Work 814, Billing 816, and Shipping 818. In the described embodiment, the user is presented with these four areas of data when registering with the privacy bank service and enters information by going through each of these data areas. Skipping Category 806 for the moment, column Type 808 takes the raw data tree down one level from the top level represented by table 802. For example, the Type for data area Home 812 is Info. This performs as a pointer or link to an Info table 820. The first column 822 of table 820 is labeled Info but the other three columns are the same as shown in table 802; that is, Category 806, Type 808, and Short display name 810.

At table 820, the user begins entering data that will be used for her home information and for Shipping since data area 818 for Shipping in table 802 also has an Info in its Type column 808. A Name row 822 has in its Type column 808 a reference to yet another table PersonName, shown as table 824. Similar to table 802 and 820, PersonName table 824 has a first column labeled PersonName and the same three columns as the other tables. All five data areas in Person-Namne table 824: Prefix, First, Middle, Last, and Suffix have as a Type a primitive type referred to as Text in the described embodiment. Text represents a data string that is the actual data item stored in the privacy bank server. By examining the Type column 808 of each of the data areas, a user enters all the raw personal data. An actual data item is entered at each Type box containing Text, indicating a primitive type, or a leaf node when viewed as a tree structure. If the Type column does not contain "Text," another table exists that refines the data area further.

To follow another example, under the data area Billing 816 shown in table 802, its Type 808 indicates BillInfo and not Text. A table BillInfo has six further data areas, none of which have a Text Type, so no actual data values can be found at this level. Taking the CreditCard data area as an example, its Type indicates "CreditCard." Table CreditCard, shown in FIG. 8C, has four data areas: Type, Number, ExpMonth, and ExpYear, all of which are of Type Text, which contain actual data values.

Short display name column 810 contains a string that is displayed to the user through a user registration graphical user interface of the described embodiment. The user follows the data tree via a user interface using the Short display name strings as field names or guides to entering the data. The data areas that have primitive Types, which in the described embodiment is Text, are the privacy bank field names that are mapped with the legacy field names in the electronic forms registered with the service. In the described embodiment, the privacy bank names include (in abbreviated form):

| | | |
|---|---|---|
| PersonName.Prefix | Address.Street1 | PhoneNum.AreaCode |
| PersonName.First | Address.Street2 | PhoneNum.Number |
| PersonName.Last | Address.City | PhoneNum.Extension |
| PersonName.Suffix | Address.StateProv | |
| | Address.PostalCode | |
| | Address.Country | |
| Internet.Email | Employment.Employer | |
| Internet.HomePage | Employment.Department | |
| CreditCard.Type | Employment.JobTitle | |
| CreditCard.Number | | |
| CreditCard.ExpMonth | | |
| CreditCard.ExpYear | | |

Category column 806 is related to privacy settings set by the user and are tied to the preferences set by a user and defined in terms of the conditions as described above, specifically in FIG. 7. The conditions or use thresholds in the described embodiment are marketing (targeted), system administration, personalization, research and development, and completion of activity (i.e. ordering). The Categories available in the described embodiment and as shown in the tables of FIGS. 8A, 8B, 8C, 8D, and 8E, are Physical Contact Information, Online Contact Information, Demographic Data, and Financial Data. The relationship between the Categories and the conditions of the described embodiment can be described as a table five-row, four-column table (a 20 cell table) where each condition is one row in the table and each Category is one column in the table.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 9:
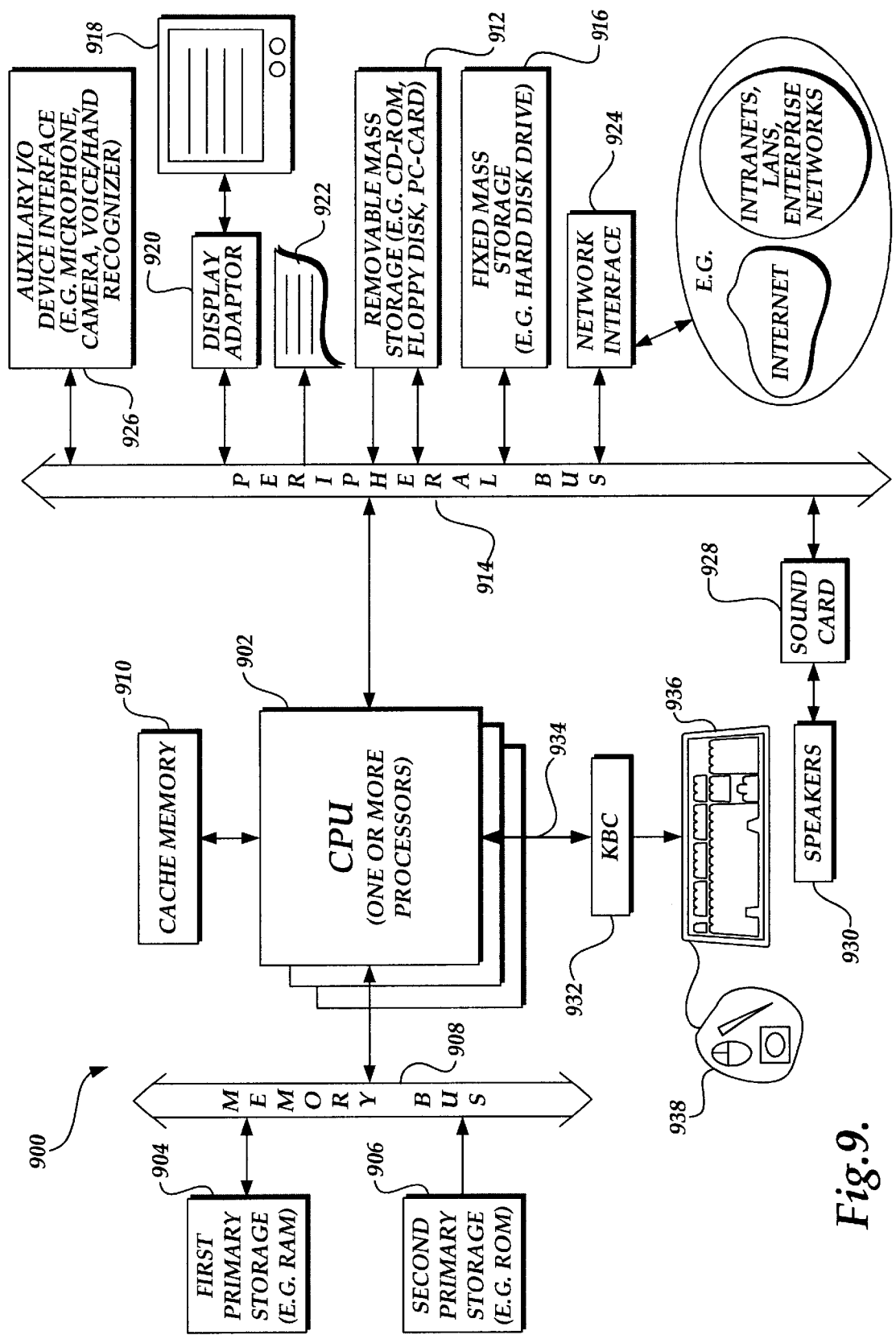
FIG. 9 is a block diagram of a typical computer system suitable for implementing an embodiment of the present invention.

FIG. 9 is a block diagram of a general purpose computer system 900 suitable for carrying out the processing in accordance with one embodiment of the present invention. FIG. 9 illustrates one embodiment of a general purpose computer system such as user computer 302 of FIG. 3A and also describes many components found in privacy bank server 308. Other computer system architectures and configurations can be used for carrying out the processing of the present invention. Computer system 900, made up of various subsystems described below, includes at least one microprocessor subsystem (also referred to as a central processing unit, or CPU) 902. That is, CPU 902 can be implemented by a single-chip processor or by multiple processors. CPU 902 is a general purpose digital processor which controls the operation of the computer system 900. Using instructions retrieved from memory, the CPU 902 controls the reception and manipulation of input data, and the output and display of data on output devices.

CPU 902 is coupled bi-directionally with a first primary storage 904, typically a random access memory (RAM), and uni-directionally with a second primary storage area 906, typically a read-only memory (ROM), via a memory bus 908. As is well known in the art, primary storage 904 can be used as a general storage area and as scratch-pad memory, and can also be used to store input data and processed data. It can also store programming instructions and data, in the form of data objects or JavaScript programs, for example, in addition to other data and instructions for processes operating on CPU 902, and is used typically used for fast transfer of data and instructions in a bi-directional manner over the memory bus 908. Also as well known in the art, primary storage 906 typically includes basic operating instructions, program code, data and objects used by the CPU 902 to perform its functions. Primary storage devices 904 and 906 may include any suitable computer-readable storage media, described below, depending on whether, for example, data access needs to be bi-directional or uni-directional. CPU 902 can also directly and very rapidly retrieve and store frequently needed data in a cache memory 910.

A removable mass storage device 912 provides additional data storage capacity for the computer system 900, and is coupled either bi-directionally or uni-directionally to CPU 902 via a peripheral bus 914. For example, a specific removable mass storage device commonly known as a CD-ROM typically passes data uni-directionally to the CPU 902, whereas a floppy disk can pass data bi-directionally to the CPU 902. Storage 912 may also include computer-readable media such as magnetic tape, flash memory, signals embodied on a carrier wave, PC-CARDS, portable mass storage devices, holographic storage devices, and other storage devices. A fixed mass storage 916 also provides additional data storage capacity and is coupled bi-directionally to CPU 902 via peripheral bus 914. The most common example of mass storage 916 is a hard disk drive. Generally, access to these media is slower than access to primary storages 904 and 906.

Mass storage 912 and 916 generally store additional programming instructions, data, and the like that typically are not in active use by the CPU 902. It will be appreciated that the information retained within mass storage 912 and 916 may be incorporated, if needed, in standard fashion as part of primary storage 904 (e.g. RAM) as virtual memory.

In addition to providing CPU 902 access to storage subsystems, the peripheral bus 914 is used to provide access other subsystems and devices as well. In the described embodiment, these include a display monitor 918 and adapter 920, a printer device 922, a network interface 924, an auxiliary input/output device interface 926, a sound card 928 and speakers 930, and other subsystems as needed.

The network interface 924 allows CPU 902 to be coupled to another computer, computer network, or telecommunications network using a network connection as shown. Through the network interface 924, it is contemplated that the CPU 902 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 902 can be used to connect the computer system 900 to an external network and transfer data according to standard protocols. That is, method embodiments of the present invention may execute solely upon CPU 902, or may be performed across a network such as the Internet, intranet networks, or local area networks, in conjunction with a remote CPU that shares a portion of the processing. Additional mass storage devices (not shown) may also be connected to CPU 902 through network interface 924.

Auxiliary I/O device interface 926 represents general and customized interfaces that allow the CPU 902 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 902 is a keyboard controller 932 via a local us 934 for receiving input from a keyboard 936 or a pointer device 938, and ending decoded symbols from the keyboard 936 or pointer device 938 to the CPU 902. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 908, peripheral bus 914, and local bus 934 are illustrative of any interconnection scheme serving to link the subsystems. For example, a local bus could be used to connect the CPU to fixed mass storage 916 and display adapter 120. The computer system shown in FIG. 9 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, the raw data can contain more or few fields than those described as needed, and there can be additional privacy or use threshold conditions than the five described. In another example, the filled out electronic form can be sent automatically to the merchant's Web server after the privacy bank server updates its raw data without additional input from the user. In another example, the raw data and legacy fields can be bundled and coded in a software module other than as a JavaScript module. Accordingly, the present embodiments are to be considered as illustrative and not restrictive, and the invention is not to be limited to the details given herein, but may be modified within the scope and equivalents of the appended claims.

What is claimed is:

1. A method for constructing a shippable software module on a personal information server suitable for execution on a remote computer for inserting data strings into an electronic form, the method comprising:

receiving a request from a remote computer for a shippable software module suitable for execution on the remote computer for inserting data strings into the electronic form;

retrieving a form mapping containing a plurality of associations between fields in the electronic form and pre-named fields on the personal information server, the mapping being associated with the electronic form;

retrieving a raw data file containing data strings from a plurality of raw data files, each data string corresponding to a pre-named field and the raw data file being associated with a particular user;

dynamically constructing a shippable software module suitable for execution on the remote computer for inserting data strings into an electronic form utilizing the form mapping and the raw data file and comparing an intended-practice condition associated with each field in the electronic form as determined by a form-originating server, with a use-preference condition associated with each pre-named field as determined by the particular user; and transmitting the shippable software module to the remote computer.

2. The method as recited in claim 1 further comprising attaching a data string from the raw data file corresponding to a pre-named field to the shippable software module for insertion into the field in the electronic form when the intended-practice condition of the field is consistent with the use-preference condition of the pre-named field.

3. The method as recited in claim 1 wherein receiving a request from a remote computer further comprises receiving a user identifier associated with the particular user and a form identifier associated with the electronic form, and wherein the remote computer issues the request when the electronic form is downloaded by the particular user.

4. The method as recited in claim 1 further comprising declining to attach a data string from the raw data file corresponding to a pre-named field to the shippable software module for insertion into the field in the electronic form when the intended-practice condition of the field is inconsistent with the use-preference condition of the pre-named field.

5. The method as recited in claim 4 wherein the intended-practice condition and the use-preference condition are collections of type-of-use descriptors.

6. The method as recited in claim 1 wherein dynamically constructing a shippable software module suitable for execution on the remote computer for inserting data strings into an electronic form utilizing the form mapping and the raw data file further comprises examining a plurality of negotiation objects for one of an acceptance and decline, each negotiation object resulting from comparing data relating to the field in the electronic form to data relating to the pre-named field.

7. The method as recited in claim 6 further comprising constructing a JavaScript module from each negotiation object resulting in an acceptance.

8. The method as recited in claim 1 wherein the shippable software module is a JavaScript program.

9. A server for enabling the automatic insertion of data strings into an electronic form having a plurality of fields displayed on a remote computer capable of communicating with the server, the server comprising:
    a first memory area for storing a plurality of raw data profiles, each raw data profile corresponding to an associated registered user;
    a second memory area for storing a plurality of form mappings, each form mapping corresponding to an associated registered form;
    a comparison module for comparing user-preference data determined by an associated registered user contained in the plurality of raw data profiles with practice-preference data determined by a form-originating server contained in the plurality of form mappings; and
    a software module constructor for dynamically constructing and transmitting a shippable program suitable for execution on a remote computer to insert data strings into an electronic form on the remote computer.

10. The server as recited in claim 9 wherein each raw data profile includes a plurality of standard field names, each standard field name having a corresponding data string and a use-preference data item as determined by the associated registered user.

11. The server as recited in claim 10 wherein each form mapping includes a plurality of non-standard field names from the electronic form, each non-standard field name being mapped to a standard field name and having a practice-preference data item as determined by a form provider.

12. The server as recited in claim 9 wherein the comparison module contains a plurality of conditions from which the practice-preference data and the use-preference data are defined.

13. The server as recited in claim 9 further comprising a negotiation history module containing a plurality of negotiation modules, each negotiation module containing an offer component and one of an acceptance component and a decline component.

14. The server as recited in claim 13 wherein the acceptance component further comprises a data string corresponding to at least one of the plurality of fields in the electronic form.

15. The server as recited in claim 9 wherein the shippable program is a JavaScript program containing instructions regarding fields in which to insert each data string in the electronic form on the remote computer.

16. The server as recited in claim 15 wherein the shippable program further comprises the plurality of data strings to be inserted in the electronic form.

17. The server as recited in claim 9 further comprising a registered user index for locating a particular raw data profile given a user identifier corresponding to a registered user.

18. The server as recited in claim 17 wherein the user identifier is a cookie.

19. The server as recited in claim 9 further comprising a form mapping index for locating a particular form mapping given an electronic form identifier.

20. The server as recited in claim 19 wherein the electronic form identifier is a Uniform Resource Locator.

21. A method for constructing a shippable software module on a personal information server suitable for execution on a remote computer for inserting data strings into an electronic form, the method comprising:
    receiving a request from a remote computer for a shippable software module suitable for execution on the remote computer for inserting data strings into the electronic form;
    retrieving a form mapping containing a plurality of associations between fields in the electronic form and pre-named fields on the personal information server, the mapping being associated with the electronic form;
    retrieving a raw data file containing data strings from a plurality of raw data files, each data string corresponding to a pre-named field and the raw data file being associated with a particular user;
    dynamically constructing a shippable software module suitable for execution on the remote computer for inserting data strings into an electronic form utilizing the form mapping and the raw data file;
    transmitting the shippable software module to the remote computer;
    registering one or more electronic forms prior to retrieving a form mapping, wherein registering one or more electronic forms comprises obtaining an electronic form so that a form mapping for a plurality of associations between fields in the electronic form and pre-named fields on the personal information server can be generated;
    obtaining intended-practice conditions for each of a plurality of fields in the electronic form; and
    embedding within the electronic form an executable linking module capable of sending a request from the remote computer to the personal information module for a shippable software module suitable for execution on the remote computer for inserting data strings into the electronic form.

22. A method for constructing a shippable software module on a personal information server suitable for execution on a remote computer for inserting data strings into an electronic form, the method comprising:

receiving a request from a remote computer for a shippable software module suitable for execution on the remote computer for inserting data strings into the electronic form;

retrieving a form mapping containing a plurality of associations between fields in the electronic form and pre-named fields on the personal information server, the mapping being associated with the electronic form;

retrieving a raw data file containing data strings from a plurality of raw data files, each data string corresponding to a pre-named field and the raw data file being associated with a particular user;

dynamically constructing a shippable software module suitable for execution on the remote computer for inserting data strings into an electronic form utilizing the form mapping and the raw data file; and transmitting the shippable software module to the remote computer;

wherein the particular user is previously registered with the personal information server, and wherein registering the particular user with the personal information server comprises:

providing the particular user's raw data corresponding to pre-named fields on the personal information server; and providing use-preference conditions for the particular user's raw data corresponding to each of the plurality of pre-named fields.

* * * * *